No. 707,661. Patented Aug. 26, 1902.
M. WEISS.
PNEUMATIC TIRE.
(Application filed May 14, 1902.)
(No Model.)
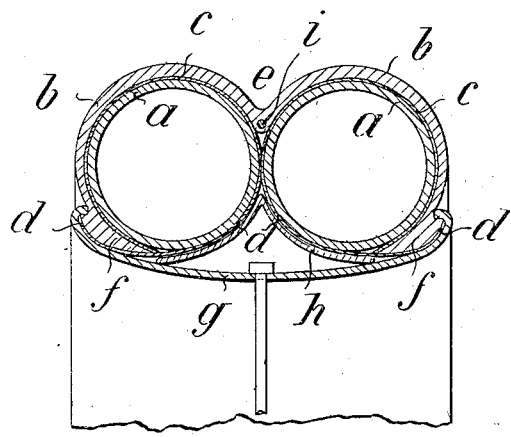
Witnesses:
Inventor
Moritz Weiss
By
Attys

UNITED STATES PATENT OFFICE.

MORITZ WEISS, OF VIENNA, AUSTRIA-HUNGARY.

PNEUMATIC TIRE.

SPECIFICATION forming part of Letters Patent No. 707,661, dated August 26, 1902.

Application filed May 14, 1902. Serial No. 107,309. (No model.)

*To all whom it may concern:*

Be it known that I, MORITZ WEISS, a subject of the Emperor of Austria-Hungary, residing at Vienna, in the Province of Lower Austria, in the Empire of Austria-Hungary, have invented certain new and useful Improvements in Pneumatic Tires; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The pneumatic tires for cycles and automobile vehicles used hitherto have the well-known drawback that when driving over slippery ground the vehicle is always liable to slide in a lateral direction. In order to diminish the danger involved by a similar inconvenience, the cyclists and automobilists are usually pumping up the tires slackly, whereby the resting-surface of the wheel on the ground, and consequently the stability of the wheel, is undoubtedly increased; but at the same time the rolling friction of the wheel is also increased in proportion.

The present invention relates to an improved arrangement of pneumatic tires for cycles and automobiles which entirely prevents the lateral sliding of the wheel even when the tire is completely pumped up and imparts to the wheel an increased stability without increasing its rolling friction. This improved tire is provided with two air-tubes arranged symmetrically to the middle plane of the wheel and are surrounded by one common cover. According to this invention the cover is provided on the middle of its interior surface with two flaps forming prolongations of the fabric which serves as backing for the cover, the said flaps being laid around the interior part of the air-tube and the free edges of the said flaps being introduced and clamped between the wheel-rim and the fixing-flanges of the tire-cover. In this manner the cover is drawn into the space between the two air-tubes, and consequently when the vehicle is driven it is in contact with the ground simultaneously on two separate places arranged symmetrically to the middle plane of the wheel.

The accompanying drawing represents a similar improved pneumatic tire in cross-section.

$a$ $a$ are the two air-tubes arranged symmetrically to the middle plane of the wheel and preferably both connected to one common air-supply device. The air-tubes are surrounded by one common cover $b$, which in the middle of its interior surface is provided with two flaps $d$, which form prolongations of the fabric-backing $c$ of the cover. These flaps are intended to hold rigidly in place the air-tubes and at the same time to produce a circular groove $e$ in the middle of the cover $b$ between the two air-tubes. For this purpose the flaps $d$ are laid around the interior parts of the air-tubes, and the free edges of the same are introduced between the fastening-flanges $f$ of the cover $b$ and the wheel-rim $g$. In this position they are clamped and held fast by the pressure of the pumped-up air-tubes.

In order to give the flaps $d$ of the fabric backing $c$ of the cover as large a bearing-surface as possible, a ring $h$ of saddle-shaped cross-section is preferably placed on the rim $g$, the said ring entering with its annular middle edge into the groove formed by the two backings $c$ of the cover surrounding the inner part of the air-tubes. In this manner the ring $h$ maintains the flaps $d$ in contact with the air-tubes.

In the rubber mass of the cover $b$ and, namely, in the part of the same where the circular groove $e$ is arranged a wire ring $i$ may be embedded for the purpose of assisting to maintain the cover in a drawn-in position between the two air-tubes.

I claim—

1. The combination with a rim, two contacting air-tubes seated therein, a cover inclosing the tubes, adapted to be secured to the edges of the rim and a ring between the two tubes above the transverse center line thereof adapted to draw said cover below the bearing-surface of the tubes, for the purpose set forth.

2. The combination with a rim, of air-tubes seated therein, a cover inclosing the tubes, a lining to the cover adapted to surround each of said tubes, and flanges on the edges of the cover adapted to clamp the lining, for the purpose specified.

3. The combination with a vehicle-rim, of a ring seated therein, two air-tubes supported on the ring, a cover inclosing the tubes, a lining interposed between the cover and tubes and adapted to surround the latter, and flanges on the edges of the cover adapted to clamp the outer edges of the lining between said flange and rim, for the purpose specified.

4. The combination with a vehicle-rim, of a ring formed with two concave surfaces centrally mounted in the rim, air-tubes mounted in the rim and resting on both surfaces of said ring, a cover inclosing said tubes, linings secured to the cover adapted to surround each of the tubes, flanges secured to the cover adapted to clamp the edges of both linings, for the purpose specified.

5. The combination with a metallic vehicle-rim provided with side flanges, of a saddle-shaped ring centrally mounted in said rim, air-tubes mounted on said ring, a cover inclosing said tubes, flanges formed on the edges of the cover adapted to take under the rim-flanges, linings secured to the cover adapted to surround each of the tubes and be clamped by the cover-flanges, and a ring embedded in said cover to draw the central part thereof below the bearing-surfaces of the air-tubes, for the purpose specified.

In testimony that I claim the foregoing as my invention I have signed my name in presence of two subscribing witnesses.

MORITZ WEISS.

Witnesses:
JOSEF RUBERCH,
ALVESTO S. HOGUE.